United States Patent
Kelty et al.

(10) Patent No.: US 8,117,857 B2
(45) Date of Patent: Feb. 21, 2012

(54) INTELLIGENT TEMPERATURE CONTROL SYSTEM FOR EXTENDING BATTERY PACK LIFE

(75) Inventors: Kurt Russell Kelty, Palo Alto, CA (US); Scott Ira Kohn, Redwood City, CA (US); Weston Arthur Hermann, Palo Alto, CA (US); Clay Hajime Kishiyama, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 526 days.

(21) Appl. No.: 12/378,909

(22) Filed: Feb. 20, 2009

(65) Prior Publication Data

US 2010/0212339 A1 Aug. 26, 2010

(51) Int. Cl.
*G01K 13/00* (2006.01)
*B60H 1/32* (2006.01)
*F25D 23/12* (2006.01)
*H02J 7/16* (2006.01)

(52) U.S. Cl. ............ 62/129; 62/244; 62/259.2; 320/150

(58) Field of Classification Search ............... 62/129, 62/239, 244, 259.2, 238.6; 320/150, 137; 180/68.4; 219/209; 700/299
See application file for complete search history.

(56) References Cited

U.S. PATENT DOCUMENTS

| 5,834,132 | A | 11/1998 | Hasegawa et al. |
| 5,982,152 | A * | 11/1999 | Watanabe et al. ............. 320/150 |
| 2002/0043413 | A1 | 4/2002 | Kimishima et al. |
| 2006/0033468 | A1 * | 2/2006 | Zhu et al. ...................... 320/104 |
| 2006/0053814 | A1 * | 3/2006 | Naik et al. ...................... 62/241 |

FOREIGN PATENT DOCUMENTS

| EP | 1 699 106 A2 | 9/2006 |
| GB | 2 416 745 A | 2/2006 |
| JP | 2004336832 | 11/2004 |

* cited by examiner

*Primary Examiner* — Chen Wen Jiang
(74) *Attorney, Agent, or Firm* — Patent Law Office of David G. Beck (57) ABSTRACT

A method and apparatus for actively cooling the battery pack of an electric vehicle after the vehicle has been turned off, thereby limiting the adverse effects of temperature on battery life, are provided. Different battery pack cooling techniques are provided, thus allowing the cooling technique used in a particular instance to be selected not only based on the thermal needs of the battery pack, but also on the thermal capacity and energy requirements of the selected approach.

8 Claims, 8 Drawing Sheets

INTELLIGENT TEMPERATURE CONTROL SYSTEM FOR EXTENDING BATTERY PACK LIFE

FIELD OF THE INVENTION

The present invention relates generally to electric vehicles and, more particularly, to a method and apparatus for efficiently controlling the temperature of the energy storage system in an electric vehicle.

BACKGROUND OF THE INVENTION

An extremely large percentage of the world's vehicles run on gasoline using an internal combustion engine. The use of such vehicles, more specifically the use of vehicles which rely on fossil fuels, e.g., gasoline, creates two problems. First, due to the finite size and limited regional availability of such fuels, major price fluctuations and a generally upward pricing trend in the cost of gasoline are common, both of which can have a dramatic impact at the consumer level. Second, fossil fuel combustion is one of the primary sources of carbon dioxide, a greenhouse gas, and thus one of the leading contributors to global warming. Accordingly, considerable effort has been spent on finding alternative drive systems for use in both personal and commercial vehicles.

Electric vehicles offer one of the most promising alternatives to vehicles that use internal combustion drive trains. To be successful, however, an electric vehicle must meet the consumers' expectations relative to performance, range, reliability, lifetime and cost. These expectations, in turn, place considerable importance on the design and configuration of the electric vehicle's rechargeable batteries since the batteries are currently one of the most expensive components associated with an electric drive train as well as one of the primary limitations to vehicle range. Furthermore, limited battery lifetime has a direct impact on long-term vehicle reliability, a problem that is clearly exacerbated by high battery replacement costs.

Accordingly, what is needed in the art is a means of extending the lifetime of a battery pack without incurring excessive additional costs. The present invention provides such a means.

SUMMARY OF THE INVENTION

The present invention limits the adverse effects of temperature on battery life by actively cooling the battery pack of an electric vehicle after the vehicle has been turned off. Preferably active cooling is provided even if the battery pack is not plugged into a recharging source. In accordance with the invention, different battery pack cooling techniques are provided, thus allowing the cooling technique used in a particular instance to be selected not only based on the thermal needs of the battery pack, but also on the thermal capacity and energy requirements of the selected approach.

In at least one embodiment of the invention, a thermal management system for an electric vehicle is disclosed, the system comprised of an ESS, a cooling system in thermal communication with the ESS and including a coolant within a coolant loop and a coolant pump, and a temperature control system coupled to, and providing control over, the cooling system. The temperature control system includes a vehicle condition monitor for monitoring the on/off state of the vehicle, at least one temperature sensor in thermal communication with the ESS, a comparator circuit for comparing the temperature of the ESS with a preset temperature, and a cooling system controller for providing control signals to the cooling system based on the output from the comparator circuit. The cooling system may further comprise a radiator coupled to the coolant loop. The cooling system may further comprise a radiator coupled to the coolant loop and a blower fan for directing air through the radiator. The thermal management system may further comprise an independent refrigeration system and a heat exchanger in thermal communication with both the refrigeration system and the cooling system. The preset temperature may comprise a range of temperatures, and the cooling system controller may activate one cooling technique, e.g., coolant pumping through the coolant loop, if the ESS temperature is within the preset temperature range, and activate an alternate technique, e.g., coolant pumping and refrigeration system operation, if the ESS temperature is greater than the preset temperature range. The thermal management system may further comprise an SOC sensor, wherein the cooling system controller outputs a deactivation signal to the cooling system if the measured SOC is less than a preset target SOC.

In at least one embodiment of the invention, a thermal management system for an electric vehicle is disclosed, the system comprised of an ESS; a cooling system in thermal communication with the ESS and including a coolant within a coolant loop and a coolant pump and a radiator coupled to the coolant loop; an independent refrigeration system; a heat exchanger in thermal communication with both the refrigeration system and the cooling system; a cooling system controller configured to output activation and deactivation signals to the refrigeration system and the cooling system in response to command signals; an SOC sensor; at least one temperature sensor in thermal communication with the ESS; and a comparator circuit for comparing the temperature of the ESS with a preset temperature range.

In at least one embodiment of the invention, a method of controlling the temperature of an ESS coupled to the electric powertrain of an electric vehicle is disclosed, the method comprising the steps of a) monitoring the operational condition of the vehicle and if the vehicle is in the off state, continuing the method with the steps of b) determining a current ESS temperature, c) comparing the current ESS temperature with a preset temperature, d) activating the ESS cooling system if the current ESS temperature is greater than the preset temperature, e) deactivating the ESS cooling system if the current ESS temperature is lower than the preset temperature, and f) repeating steps b) through e) until the current ESS temperature is lower than the preset temperature. The step of activating the cooling system may comprise the step of pumping coolant through a coolant loop in thermal communication with the ESS. The step of activating the cooling system may comprise the step of pumping coolant through a coolant loop and a radiator coupled to the coolant loop, the coolant loop being in thermal communication with the ESS. The step of activating the cooling system may comprise the step of pumping coolant through a coolant loop and a heat exchanger coupled to the coolant loop, the coolant loop being in thermal communication with the ESS, and operating a refrigeration system in thermal communication with the heat exchanger. The method may further comprise the steps of determining the difference between the current ESS temperature and the preset temperature, and selecting the cooling system implementation based on the temperature difference.

In at least one embodiment of the invention, a method of controlling the temperature of an ESS coupled to the electric powertrain of an electric vehicle is disclosed, the method comprising the steps of a) monitoring the operational condition of the vehicle and if the vehicle is in the off state, continuing the method with the steps of b) determining a current ESS temperature, c) comparing the current ESS temperature with a preset temperature range, d) activating a first ESS cooling system implementation if the current ESS temperature is within the preset temperature range, e) activating a second ESS cooling system implementation if the current ESS temperature is greater than the preset temperature range, f) terminating ESS cooling if the current ESS temperature is lower than the preset temperature range, and g) repeating steps b) through f) until the current ESS temperature is lower than the preset temperature range. In at least one embodiment, the first ESS cooling system implementation has a lower thermal capacity and requires less power to operate than the second ESS cooling system implementation. In at least one embodiment, the first and second ESS cooling system implementations include the step of pumping coolant through a coolant loop and through a heat exchanger, the coolant loop in thermal communication with the ESS, and the second ESS cooling system implementation further includes the step of operating a refrigeration system in thermal communication with the heat exchanger. The method may further comprise the steps of determining a current SOC for the ESS, comparing the current SOC with a preset target SOC, and terminating ESS cooling if the current SOC is lower than the preset target SOC.

In at least one embodiment of the invention, a method of controlling the temperature of an ESS coupled to the electric powertrain of an electric vehicle is disclosed, the method comprising the steps of a) monitoring the operational condition of the vehicle and if the vehicle is in the off state, continuing the method with the steps of b) determining a current ESS temperature, c) comparing the current ESS temperature with a first preset temperature range, d) terminating ESS cooling if the current ESS temperature is lower than the first preset temperature range, e) activating a first ESS cooling system implementation if the current ESS temperature is within the first preset temperature range, f) comparing the current ESS temperature with a second preset temperature range if the current ESS temperature is greater than the first preset temperature range, g) activating a second ESS cooling system implementation if the current ESS temperature is within the second preset temperature range, h) activating a third ESS cooling system implementation if the current ESS temperature is greater than the second preset temperature range, and i) repeating steps b) through h) until the current ESS temperature is lower than the first preset temperature range.

In at least one embodiment of the invention, a method of controlling the temperature of an ESS coupled to the electric powertrain of an electric vehicle is disclosed, the method comprising the steps of a) monitoring the operational condition of the vehicle and if the vehicle is in the off state, continuing the method with the steps of b) determining a current SOC of the ESS; c) comparing the current SOC with a preset SOC target range; d) terminating ESS cooling if the current SOC is lower than the preset SOC target range; e) performing steps f) through j) if the current SOC is within the preset SOC target range and steps k) through p) if the current SOC is greater than the preset SOC target range; f) determining a current ESS temperature; g) comparing the current ESS temperature with a target temperature; h) activating a first ESS cooling system implementation if the current ESS temperature is greater than the target temperature; i) deactivating the first ESS cooling system implementation if the current ESS temperature is lower than the target temperature; j) repeating steps f) through i) until the current ESS temperature is lower than the target temperature; k) determining the current ESS temperature; l) comparing the current ESS temperature with a preset temperature range; m) activating a second ESS cooling system implementation if the current ESS temperature is within the preset temperature range; n) activating a third ESS cooling system implementation if the current ESS temperature is greater than the preset temperature range; o) terminating ESS cooling if the current ESS temperature is lower than the preset temperature range; and p) repeating steps k) through o) until the current ESS temperature is lower than the preset temperature range.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The terms "energy storage system" and "ESS" may be used interchangeably and refer to an electrical energy storage system that has the capability to be charged and discharged such as a battery or battery pack. The term "EV" as used herein refers to an all-electric vehicle. The terms "hybrid", "hybrid electric vehicle" and "HEV" may be used interchangeably and refer to a vehicle that uses dual propulsion systems, one of which is an electric motor and the other of which is a combustion engine. The terms "plug-in hybrid vehicle" and "PHEV" may be used interchangeably and refer to a hybrid vehicle that can be plugged into an external power source, such as the power grid, in order to charge the on-board batteries. The term "electric vehicle" as used herein refers to an EV, HEV or PHEV. Lastly, identical element symbols used on multiple figures refer to the same component, or components of equal functionality.

Figure 1:
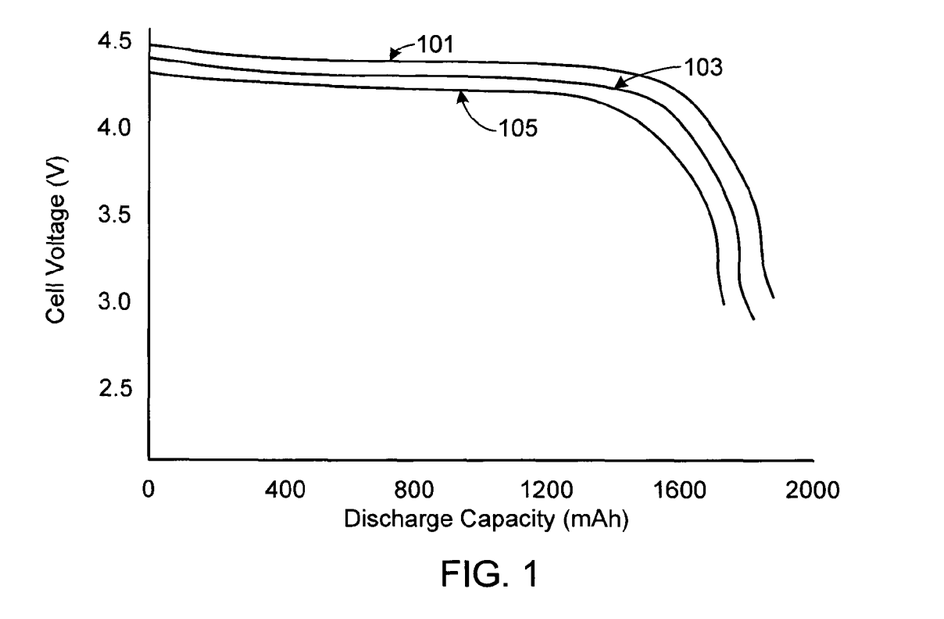
FIG. 1 graphically illustrates the effects of temperature on cell voltage and discharge capacity.
Figure 2:
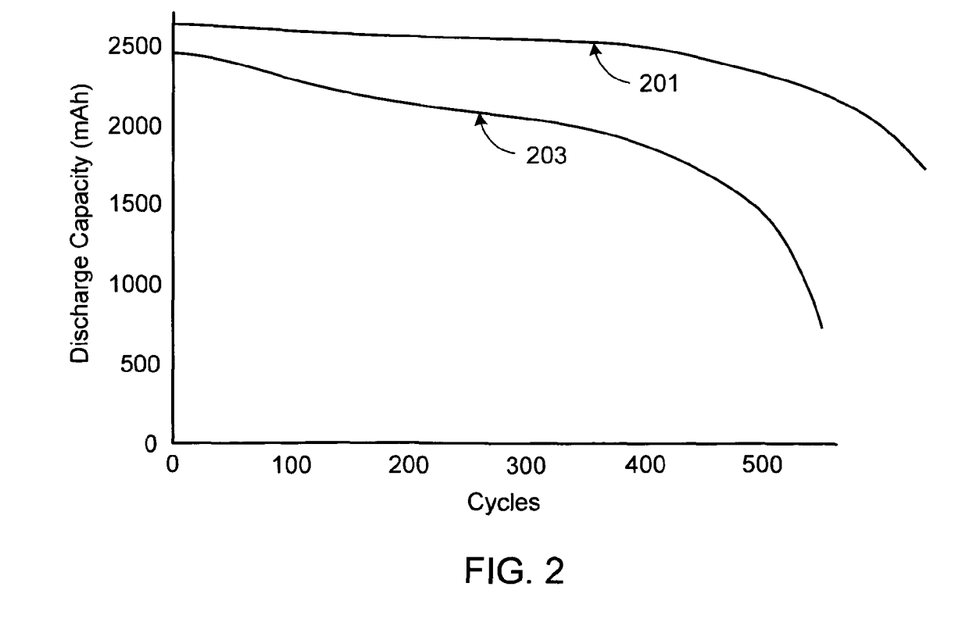
FIG. 2 graphically illustrates the effects of cycling temperature on battery capacity.
Figure 3:
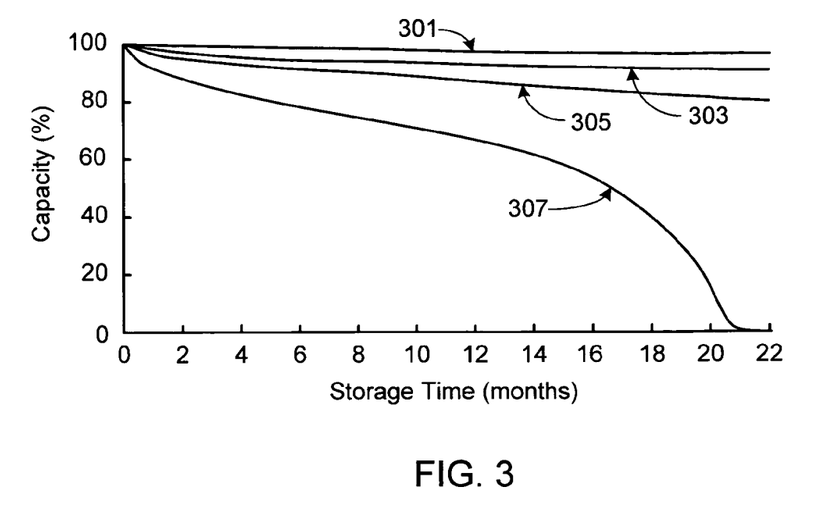
FIG. 3 graphically illustrates the effects of storage temperature on battery lifetime.

FIGS. 1-3 illustrate the adverse effects of temperature on battery performance. It should be understood that different battery packs, for example those using a different cell chemistry, will exhibit different profiles than those shown in FIGS. 1-3, and that these figures are only meant to be illustrative, not limiting.

FIG. 1 is a graph illustrating the effects of temperature on the cell voltage and discharge capacity of an exemplary battery. In the figure, curve 101 corresponds to a temperature of 40° C., curve 103 corresponds to a temperature of 30° C., and curve 105 corresponds to a temperature of 20° C. As illustrated, an increase in operating temperature from 20° C. to 40° C. dramatically improves discharge capacity which, in turn, can lead to improved driving range for an electric vehicle using such a battery pack. An increase in temperature also reduces the impedance which enables faster acceleration. A drawback, however, of operating at a higher temperature is the effect such a temperature has on battery life, specifically shortening the battery's life. Another adverse effect of higher temperatures is that a battery will typically exhibit higher non-recoverable capacity loss as the temperature is increased. This battery characteristic is illustrated in FIG. 2 in which curve 201 is for a battery pack cycled at 35° C. and curve 203 is for a battery pack cycled at 55° C. As shown, by decreasing the storage temperature of a battery, it is able to retain a much higher capacity over more cycles. This same effect is illustrated in a different way in FIG. 3 in which discharge capacity is graphed as a function of battery storage time. This figure shows that at a storage temperature of 0° C. there is very little degradation of battery life (curve 301); at a storage temperature of 20° C. there is a slightly more pronounced effect (curve 303); at a storage temperature of 40° C. the degradation of capacity is much more pronounced, although potentially acceptable for some applications (curve 305); while at a storage temperature of 60° C. battery life degradation is too rapid to be acceptable (curve 307) except for the most limited applications.

In order to limit the adverse effects of temperature on battery life, the present invention continues to actively cool the battery pack of an electric vehicle after the vehicle has been turned off, i.e., after the key or other on/off control switch has been turned to the 'off' position. In the preferred embodiment of the invention, active cooling continues even if the vehicle is not plugged into a recharging power source.

Figure 4:
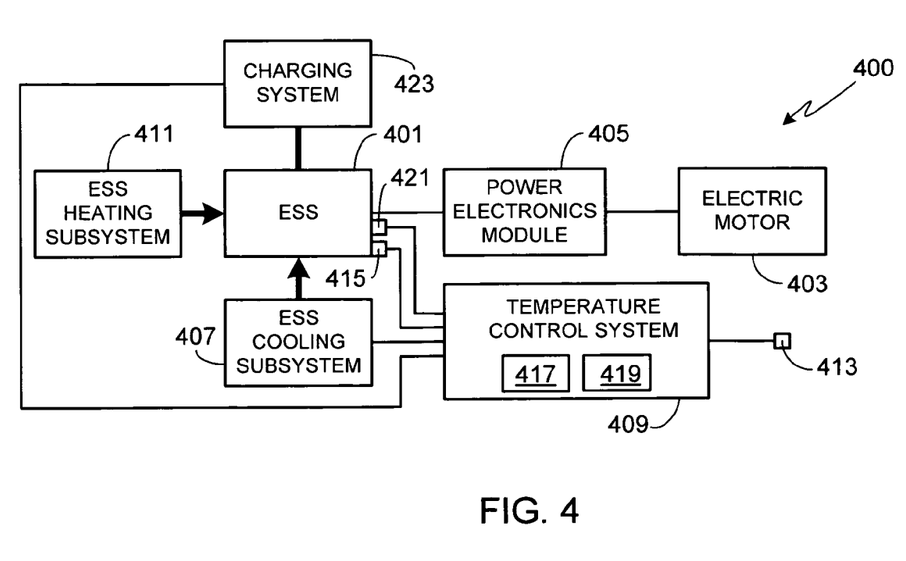
FIG. 4 is a high-level view of the primary vehicle subsystems involved in an ESS cooling system designed in accordance with a preferred embodiment of the invention.

FIG. 4 is a high-level view of the primary vehicle subsystems involved in an ESS cooling system designed in accordance with a preferred embodiment of the invention. It will be appreciated that a vehicle can utilize other system configurations while still retaining the functionality of the present invention. As shown, system 400 includes an electrical energy storage system (ESS) 401 coupled to a vehicle propulsion electric motor 403 via a power electronics module 405. In a preferred embodiment, ESS 401 is comprised of a battery pack. Motor 403 can be a single electric motor, or multiple electric motors, and be used in any type of electric vehicle, i.e., EV, HEV, or PHEV. Power electronics module 405 is used to insure that the power delivered to motor 403 has the desired voltage, current, waveform, etc. Thus, for example, power electronics module 405 preferably includes a DC to AC inverter. It should be understood that the power electronics module may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, etc. Coupled to ESS 401 is an ESS cooling subsystem 407 under the control of a temperature control system 409. In at least one embodiment, ESS cooling subsystem 407 is combined with an ESS heating subsystem 411 in a temperature management system.

Figure 5:
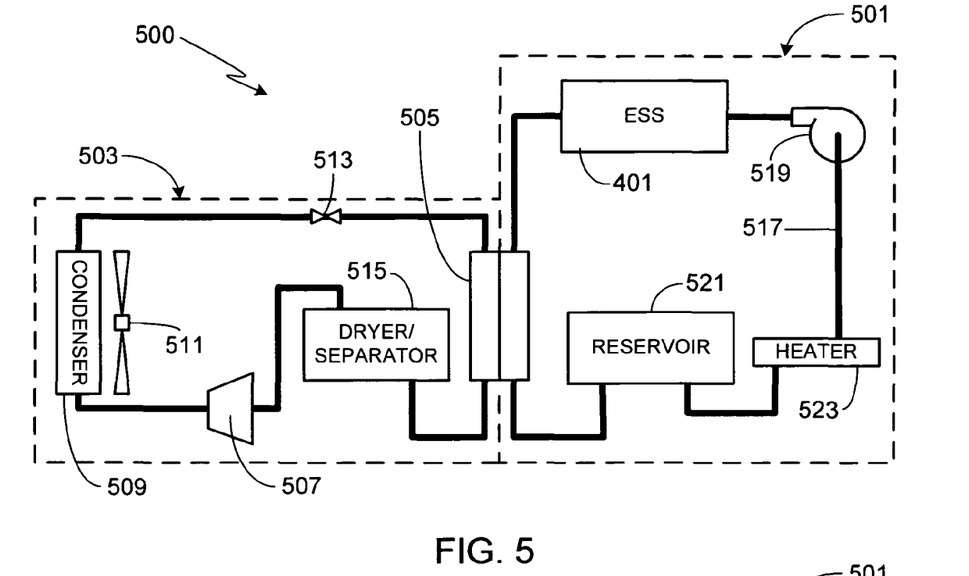
FIG. 5 schematically illustrates one embodiment of an ESS cooling system in accordance with the invention.

FIG. 5 schematically illustrates a thermal management system 500 in accordance with a preferred embodiment of the invention. The system includes the ESS cooling subsystem 501 coupled to a refrigeration subsystem 503 via a heat exchanger 505. Although not described in detail herein, it should be understood that a thermal management system for an electric vehicle will also typically includes a heating, ventilation and cooling (HVAC) subsystem as well as a powertrain cooling subsystem, for example as described in co-pending and co-assigned U.S. patent application Ser. No. 11/786,108, filed Apr. 11, 2007, the disclosure of which is incorporated herein by reference for any and all purposes.

Preferably refrigeration subsystem 503 is a standard refrigeration subsystem as is well known by those of skill in the art. As such, refrigeration subsystem 503 is comprised of a compressor 507, condenser 509, fan 511, thermostatic expansion valve 513, dryer/separator 515, and heat exchanger 505. Compressor 507 compresses the low temperature refrigerant vapor in the subsystem into a high temperature vapor. The refrigerant vapor then dissipates a portion of the captured heat when it passes through condenser 509, thereby leading to a phase change from vapor to liquid, the liquid remaining at a high temperature and pressure. Preferably the performance of condenser 509 is enhanced by using a blower fan 511 as shown. The liquid phase refrigerant then passes through thermal expansion valve 513 which lowers both the temperature and pressure of the refrigerant as well as controlling the flow rate of refrigerant into heat exchanger 505. Heat exchanger 505 provides a simple means for transferring heat between the refrigerant contained in subsystem 503 and the coolants contained in ESS cooling subsystem 501 or in the other thermal subsystems, e.g., a HVAC or drive train cooling subsystem. After being heated in heat exchanger 505, the refrigerant is separated into the liquid and vapor phases by dryer/separator 515, thus insuring that only vapor passes through compressor 507. It should be appreciated that although refrigeration subsystem 503 is preferred, the invention can utilize other refrigeration subsystem configurations. Preferably whatever refrigeration subsystem configuration is used, it includes a heat exchanger which can be used cooperatively with the battery cooling subsystem as described herein.

ESS cooling subsystem 501 includes ESS 401 coupled to a coolant loop 517 containing a coolant, i.e., a heat transfer medium. In a typical electric vehicle, the coolant is pumped through ESS 401, for example via a heat transfer plate (not shown) coupled to the battery pack, by a circulation pump 519. As the coolant circulates through coolant loop 517, after withdrawing heat from ESS 401 the coolant is cooled via heat transfer with the refrigerant in heat exchanger 505. Preferably the battery cooling subsystem also includes a coolant reservoir 521. Additionally, in at least one embodiment of the invention and as previously noted, cooling loop 517 is also thermally coupled to a heater 523 (e.g., a PTC heater), thus insuring that the temperature of ESS 401 can be maintained within its preferred operating range regardless of the ambient temperature.

It will be appreciated that there are numerous ways of controlling the amount of cooling supplied by refrigeration subsystem 503 to ESS cooling subsystem 501. One approach is through the use of valves, for example a valve within coolant loop 517 can be used to control the flow of coolant through the ESS cooling subsystem 501 and thus the level of cooling achieved via heat exchanger 505. Alternately, by varying the speed of coolant circulation pump 519, the degree of cooling can be varied.

Figure 6:
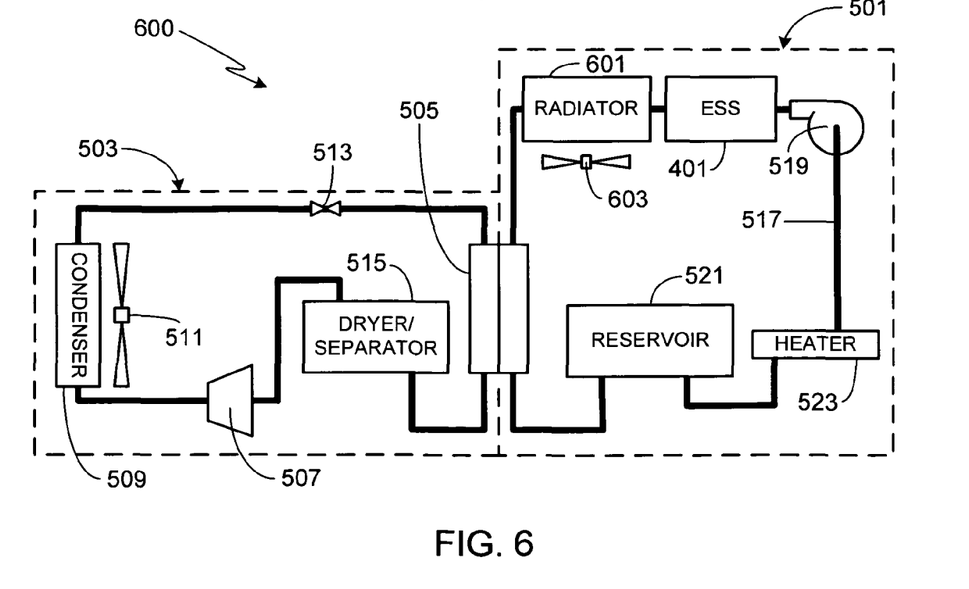
FIG. 6 schematically illustrates an alternate embodiment of an ESS cooling system in accordance with the invention.

FIG. 6 illustrates an alternate embodiment of a thermal management system in accordance with the invention. System 600 is the same as system 500, except for the addition of a radiator 601 coupled to coolant loop 517. Radiator 601 provides an additional means for cooling the coolant within loop 517, thereby reducing the thermal load placed on heat exchanger 505 and refrigeration subsystem 503. Preferably the performance of radiator 601 is enhanced by using a blower fan 603 as shown.

Figure 7:
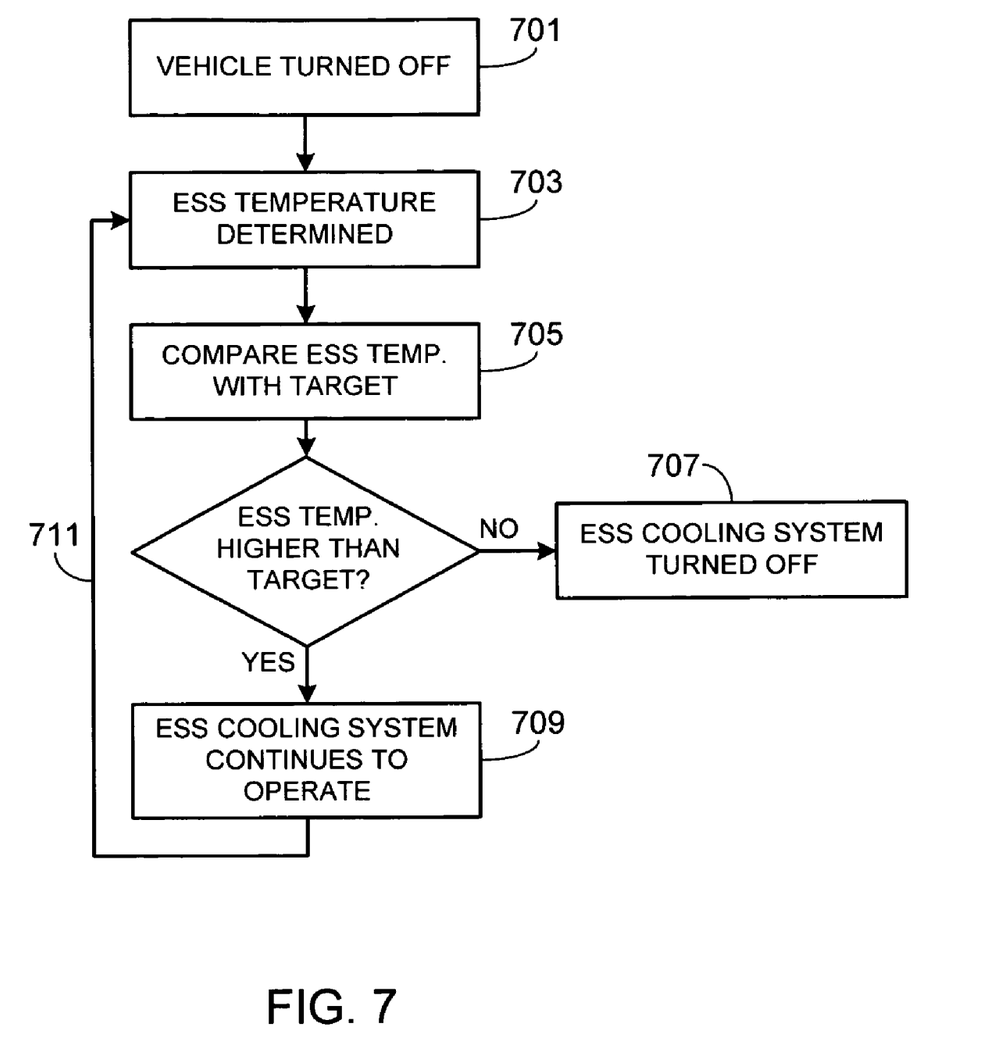
FIG. 7 illustrates the methodology of one embodiment in which a single cooling technique is used.

FIG. 7 illustrates the methodology of one embodiment of the invention. When the vehicle is turned off (step 701), a vehicle condition monitor 413 transmits an appropriate signal to the temperature control system 409. The temperature control system 409 then determines the temperature of ESS 401 using temperature sensor 415 (step 703). Preferably sensor 415 is a thermocouple, although it will be appreciated that other types of sensors can be used. Additionally, although FIG. 4 only shows a single sensor 415, it should be understood that in some embodiments multiple sensors 415 are used, these sensors being located throughout ESS 401. Preferably if multiple sensors 415 are used, either an average temperature or the highest monitored temperature is used by temperature control system 409 during subsequent processing steps.

After determining the ESS temperature, temperature control system 409 compares the monitored ESS temperature with a target temperature (step 705), for example using a simple comparator circuit 417. Typically the target temperature will be set by the manufacturer of the vehicle. Preferably the target temperature is set in the range of 20° C. to 55° C.; more preferably the target temperature is set in the range of 20° C. to 40° C.; still more preferably the target temperature is set in the range of 20° C. to 30° C.; yet still more preferably the target temperature is set in the range of 20° C. to 25° C.; and yet still more preferably the target temperature is set at 20° C. If the monitored ESS temperature is less than or equal to the target temperature, the cooling system controller 419 of the temperature control system 409 turns off the battery cooling system (step 707). If the monitored ESS temperature is greater than the target temperature, the cooling system controller 419 of the temperature control system 409 continues to operate the battery cooling system (step 709). This process continues (step 711) until the monitored ESS temperature is less than or equal to the target temperature.

In addition to lowering the temperature of ESS 401, thereby extending battery life, the present invention also helps to limit, if not altogether eliminate, hot-spots or large temperature inconsistencies within the ESS. It will be appreciated that without the present invention, if the cooling system stops operation when the vehicle is turned off, the ESS will quickly develop hot-spots since the outer surfaces of the ESS will typically cool at a more rapid rate than the core of the ESS. Thus, for example, if ESS 401 is comprised of a battery pack, the batteries contained within the core of the battery pack will be much hotter than the batteries along the periphery of the pack. This, in turn, can lead to the inner batteries degrading at an accelerated rate compared to the outer batteries. By continuing to operate the cooling system after the vehicle is turned off, as presently described, the entire ESS will cool down at approximately the same rate.

The present invention can utilize any of several different techniques for cooling ESS 401. The primary techniques, which can be used either alone or in combination with one another, are described below.

i) Coolant Flow—In a first technique utilizing a system as shown in FIG. 5, the coolant fluid is continuously pumped through coolant loop 517. In this approach refrigeration subsystem 503 is not activated. Although this approach can lower the temperature of ESS 401, and assure cell temperature consistency assuming a battery based ESS, clearly the extent to which this approach can lower ESS temperature is limited since after a period of operation the coolant and the ESS temperatures will stabilize at approximately the same temperature.

ii) Radiator—In the second technique, the system shown in FIG. 6 is used. In this approach, the coolant fluid is continuously pumped through coolant loop 517, thereby flowing through radiator 601. In this approach refrigeration subsystem 503 is not activated. Preferably the system includes a blower fan 603, thus providing a means for actively withdrawing heat from radiator 601. Although this approach can lower the ESS temperature below that achievable without the radiator, it will be appreciated that the extent to which it can lower the temperature is still somewhat limited.

iii) Refrigeration Subsystem—In the third technique, the system shown in FIG. 5 is used. In this approach, the coolant fluid is continuously pumped through coolant loop 517 while simultaneously operating refrigeration subsystem 503.

iv) Refrigeration Subsystem Plus Radiator—In the fourth technique, the system shown in FIG. 6 is used. In this approach, the coolant fluid is continuously pumped through coolant loop 517 while simultaneously operating refrigeration subsystem 503. While refrigeration subsystem 503 is the primary cooling source, it will be appreciated that radiator 601, alone or in combination with blower fan 603, withdraws at least a portion of the heat from ESS 401, thereby lowering the thermal burden placed on the refrigeration subsystem.

Figure 8:
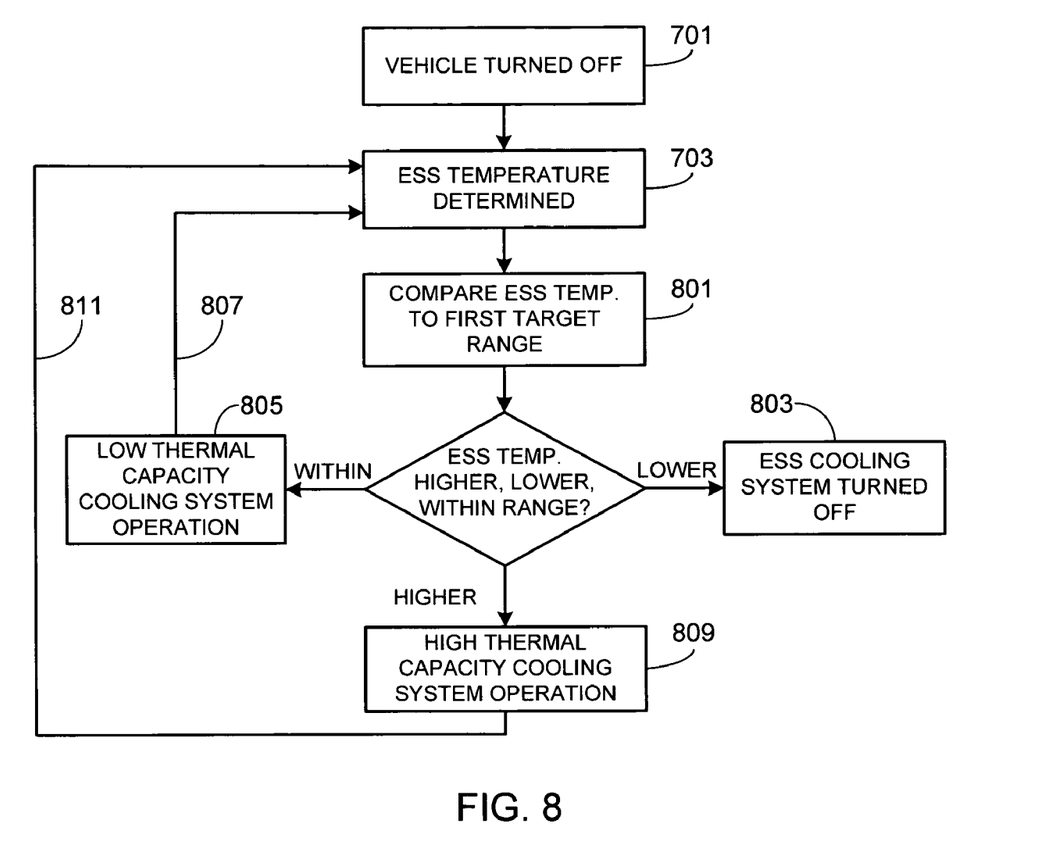
FIG. 8 illustrates an alternate methodology utilizing dual cooling techniques.

In one embodiment of the invention, when temperature control system 409 determines that ESS cooling is required, one of the cooling techniques described above is used regardless of the monitored ESS temperature. The cooling technique used in this embodiment is preset. In an alternate embodiment, temperature control system 409 determines the cooling technique to be applied based on ESS temperature. This approach is illustrated in FIG. 8. As shown, after determining the ESS temperature (step 703), temperature control system 409 compares that temperature to a target temperature range (step 801). If the monitored ESS temperature is less than the target temperature range, the ESS cooling system is turned off (step 803). If the monitored ESS temperature is within the target temperature range, a first type of cooling is employed (step 805), for example pumping the coolant through loop 517, loop 517 preferably coupled to a radiator 601 as described above. The ESS temperature is continually monitored (step 807) until the monitored ESS temperature is less than the target temperature range. If the monitored ESS temperature is above the target temperature range, then temperature control system 409 initiates operation of a second, higher thermal capacity cooling system (step 809), for example pumping the coolant through loop 517 while simultaneously operating refrigeration subsystem 503. The overall process continues (step 811) until the monitored ESS temperature is less than the target temperature range.

It will be appreciated that while the embodiment illustrated in FIG. 7 only uses a single cooling technique, and the embodiment illustrated in FIG. 8 only uses two cooling techniques, i.e., low/high cooling, the system of the invention can be used equally well with more than just two techniques. The primary advantage of using multiple cooling techniques, based on ESS temperature, is that the amount of cooling employed can be tailored to the cooling requirements of ESS 401. This, in turn, maximizes overall system efficiency, and thus efficient use of limited ESS resources, since the energy needs of the various cooling techniques generally increase with increasing cooling capacity.

Figure 9:
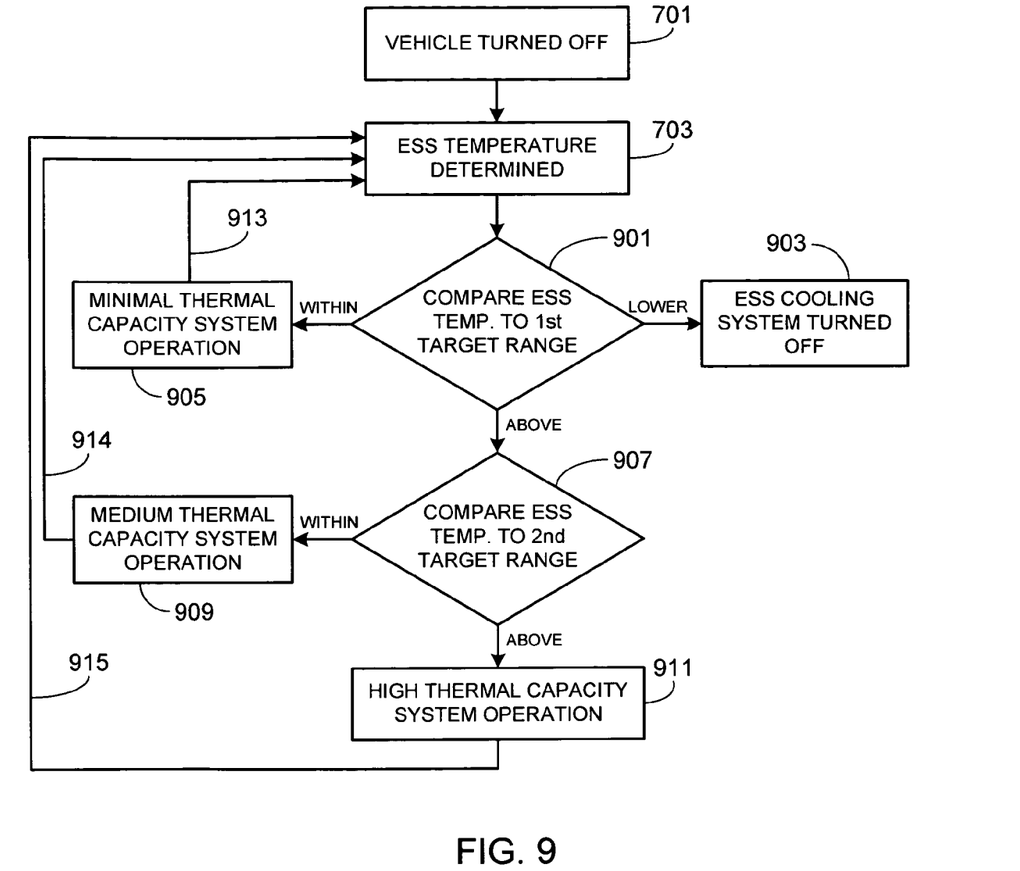
FIG. 9 illustrates an alternate methodology utilizing a multi-mode cooling approach.

FIG. 9 illustrates an exemplary multi-stage approach, thereby achieving improved system efficiency over the approaches illustrated in FIGS. 7 and 8. As shown, after determining the ESS temperature (step 703), temperature control system 409 compares that temperature to a first target temperature range (step 901). If the monitored ESS temperature is less than the first target temperature range, the ESS cooling system is turned off (step 903). If the monitored ESS temperature is within the first target temperature range, a minimal thermal capacity cooling system is employed (step 905), for example simply pumping the coolant through loop 517, loop 517 coupled to a radiator 601 as described above. If the monitored ESS temperature is above the first target temperature range, temperature control system 409 compares the measured ESS temperature to a second target temperature range (step 907). If the monitored ESS temperature is within the second target temperature range, a medium thermal capacity cooling system is employed (step 909), for example turning on blower fan 603 in addition to pumping the coolant through loop 517. If the monitored ESS temperature is above the second target temperature range, then temperature control system 409 initiates operation of a high thermal capacity cooling system (step 911), for example pumping the coolant through loop 517 while simultaneously operating refrigeration subsystem 503. The process loops back via control loops 913-915 until the monitored ESS temperature is less than the first target temperature range.

In at least one preferred embodiment of the invention, in addition to monitoring ESS temperature, temperature control system 409 also monitors the ESS state of charge (SOC) with a SOC sensor 421. Temperature control system 409 can use this information in several ways, all of which add further refinements to the approach of the invention.

Figure 10:
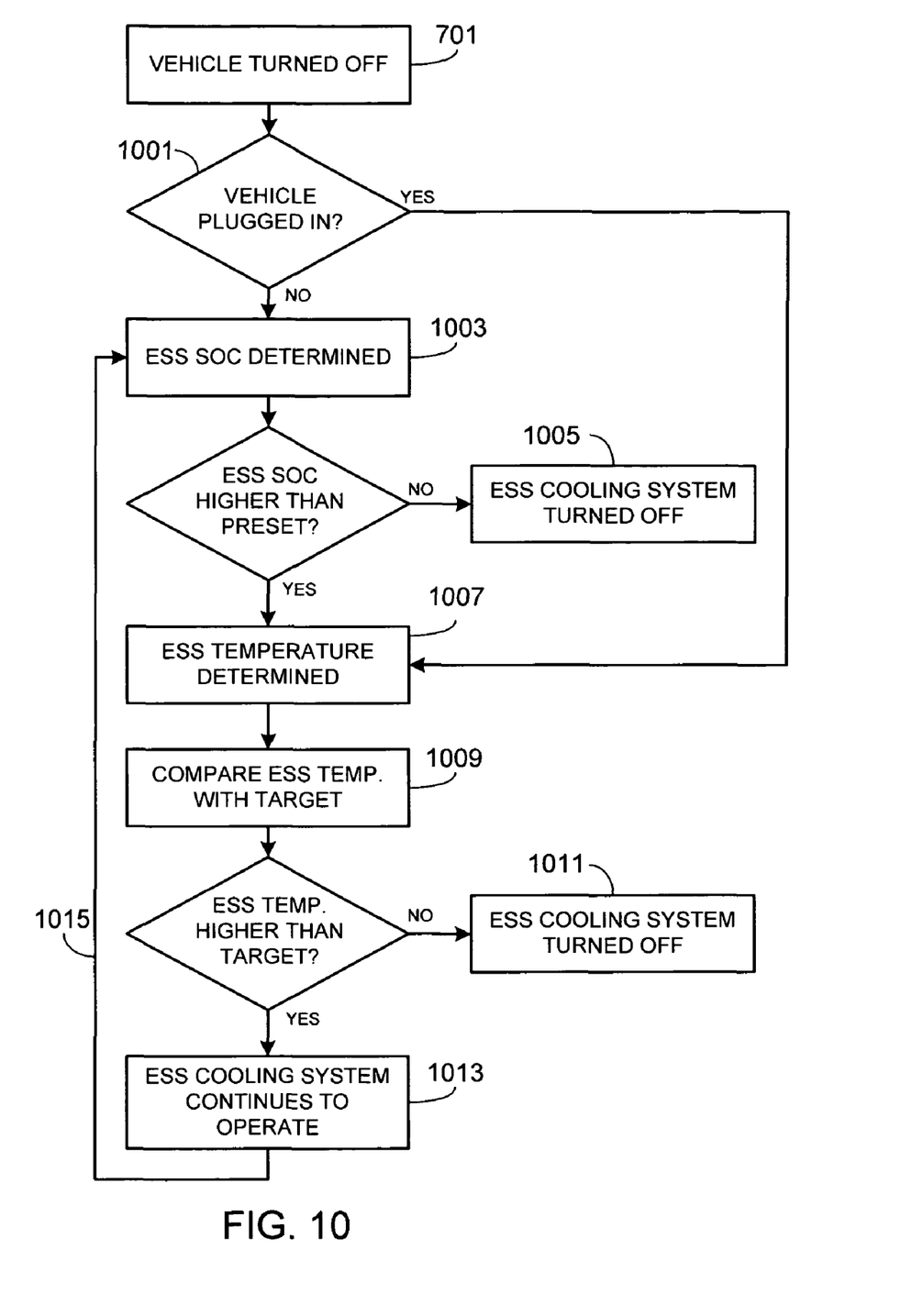
FIG. 10 illustrates an alternate methodology similar to that illustrated in FIG. 7, with the addition of ESS SOC monitoring steps.

In one system, control system 409 monitors the SOC of ESS 401 with sensor 421 in order to determine whether or not to actively cool ESS 401 after the vehicle is turned off, since at low charge levels high battery temperature does not cause as much battery life degradation as it does at high charge levels. FIG. 10 illustrates the methodology shown in FIG. 7, modified to monitor SOC. Although not required, preferably in this approach after the vehicle has been turned off (step 701), control system 409 determines if the system has been connected to an external recharging source, i.e., plugged-in (step 1001), for example by monitoring the condition of the charging system 423. If the control system determines that the system is plugged-in, in at least one embodiment the system bypasses the ESS SOC steps and goes directly to the temperature determining step (step 1007) since ESS loading is not an issue. If temperature control system 409 determines that the system is not plugged-in, then it determines the SOC of ESS 401 using SOC sensor 421 (step 1003). If the monitored ESS SOC is less than a preset amount, the battery cooling system is turned off (step 1005). In one embodiment, the preset target SOC is 10%; in an alternate embodiment, the target SOC is 20%; in an alternate embodiment, the target SOC is 30%. It will be appreciated that the invention is not limited to a specific preset target SOC. If the monitored ESS SOC is greater than the preset, control system 409 measures the ESS temperature (step 1007) and compares that temperature to a target temperature range (step 1009). If the monitored ESS temperature is less than or equal to the target temperature, the ESS cooling system is turned off (step 1011). If the monitored ESS temperature is greater than the target temperature, the ESS cooling system continues to operate (step 1013). This process continues (step 1015) until the monitored ESS temperature is less than or equal to the target temperature or the ESS SOC is less than the preset SOC target. It should be understood that the ESS SOC monitoring steps can also be used with multi-stage cooling techniques, such as those described above and illustrated in FIGS. 9 and 10.

Figure 11:
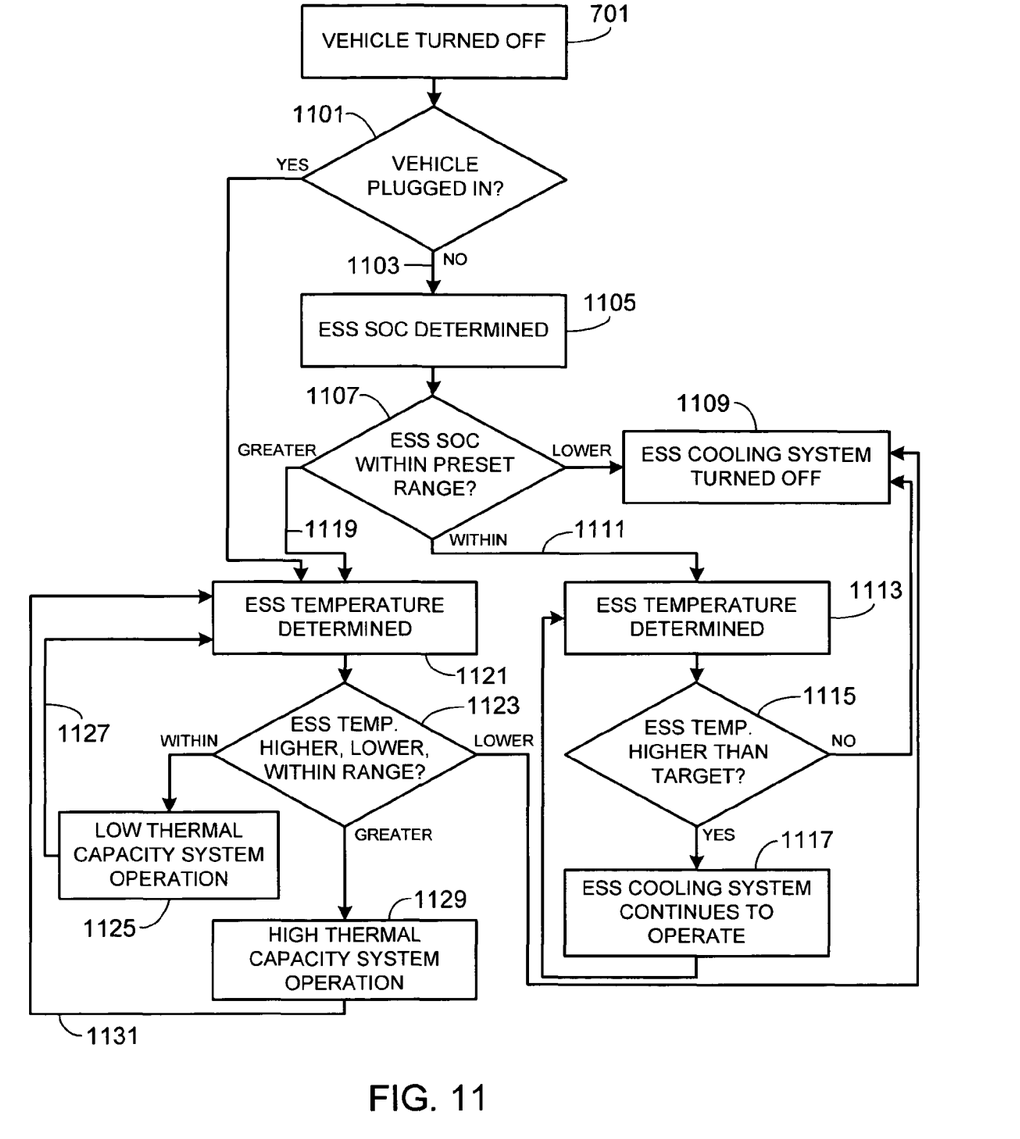
FIG. 11 illustrates an alternate methodology similar to that illustrated in FIG. 8, with the addition of ESS SOC monitoring steps.

Given that each of the various cooling techniques will place a different load on the ESS system, in at least one embodiment of the invention, in addition to using SOC information to determine whether or not ESS cooling is required, the SOC information is used to determine which cooling techniques are available for use, depending upon ESS temperature. For example as illustrated in FIG. 11, after the vehicle is turned off (step 701), temperature control system 409 determines if the system has been connected to an external recharging source, i.e., plugged-in (step 1101). If the control system determines that the system is plugged-in, in at least one embodiment it bypasses the ESS SOC steps and goes directly to the temperature determining step (step 1121) since ESS loading is no longer an issue. If, however, temperature control system 409 determines that the system is not plugged-in to an external power source (step 1103), then the ESS SOC is determined (step 1105) and the monitored SOC is compared to a preset SOC range (step 1107). It should be understood that the invention can use more than just a single SOC range in determining which cooling technique should be applied, and that the approach described and illustrated in FIG. 11 is only meant to illustrate, not limit, the invention. In one embodiment, the preset SOC range is 10%-80%; in an alternate embodiment the preset SOC range is 20%-60%; in an alternate embodiment the preset SOC range is 25%-45%; clearly other ranges can be used in the invention and these are just exemplary ranges.

In this embodiment, if the monitored ESS SOC is less than the preset SOC range, then the ESS SOC is low enough that serious battery life degradation is not expected, even at high temperatures. Accordingly in this situation the battery cooling system is turned off (step 1109). If the ESS SOC is within the preset range (step 1111), then the ESS SOC is high enough that cooling is required to limit battery degradation, but not high enough to utilize any available cooling technique. In this instance, the ESS temperature is measured (step 1113) and compared to a preset temperature (step 1115). If the monitored ESS temperature is less than the preset target, the cooling system is turned off (step 1109) as the temperature is low enough to prevent serious battery degradation. If the monitored ESS temperature is greater than the preset target, a relatively low power cooling technique is employed (step 1117), thereby lowering the ESS temperature while placing a minimal drain on the ESS system. For example, in this step only coolant pumping, or a combination of coolant pumping and blower fan operation, may be used. If in step 1107 it is determined that the ESS SOC is greater than the preset range (step 1119), then the system does not limit the cooling technique selected to cool the ESS. In this instance the system may employ two different cooling techniques as described relative to FIG. 8, or more than two different cooling techniques as described relative to FIG. 9. In the approach illustrated in FIG. 11, a dual cooling technique approach is used, similar to that of FIG. 8. As shown, after determining the ESS temperature (step 1121), temperature control system 409 compares that temperature to a target temperature range (step 1123). If the monitored ESS temperature is less than the target temperature range, the ESS cooling system is turned off (step 1109). If the monitored ESS temperature is within the target temperature range, a first type of cooling is employed (step 1125), for example pumping the coolant through loop 517, loop 517 preferably coupled to a radiator 601 as described above. The ESS temperature is continually monitored (step 1127) until the monitored ESS temperature is less than the target temperature range. If the monitored ESS temperature is above the target temperature range, then temperature control system 409 initiates operation of a second, higher thermal capacity cooling system (step 1129), for example pumping the coolant through loop 517 while simultaneously operating refrigeration subsystem 503. The overall process continues (step 1131) until the monitored ESS temperature is less than the target temperature range.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A thermal management system for an electric vehicle comprising:
    an electrical energy storage system (ESS) coupled to an electric vehicle powertrain, said electrical ESS supplying power to an electric motor of said electric vehicle powertrain;
    a cooling system comprised of a coolant within a coolant loop, said coolant loop in thermal communication with said ESS, said coolant system further comprised of a coolant pump for pumping said coolant through said coolant loop;
    a refrigeration system independent of said cooling system;
    a heat exchanger in thermal communication with said refrigeration system and in thermal communication with said cooling system via said coolant loop;
    a temperature control system coupled to said cooling system, wherein said cooling system is under the control of said temperature control system, wherein said temperature control system further comprises:
        a vehicle condition monitor, wherein said vehicle condition monitor outputs a first condition signal when said electric vehicle is on and outputs a second condition signal when said electric vehicle is off;
        a charging system monitor, wherein said charging system monitor outputs a first status signal when said electric vehicle is coupled to a battery charging system and outputs a second status signal when said electric vehicle is not coupled to a battery charging system;
        at least one temperature sensor in thermal communication with said ESS, said at least one temperature sensor monitoring an ESS temperature;
        a comparator circuit for comparing said ESS temperature with a preset temperature, wherein said comparator circuit outputs a first signal when said ESS temperature is less than said preset temperature and outputs a second signal when said ESS temperature is greater than said preset temperature; and
        a cooling system controller coupled to said cooling system, said cooling system controller configured to output a control signal to said cooling system when said vehicle condition monitor outputs said second condition signal and said charging system monitor outputs said second status signal, said cooling system controller further configured to receive said first and second signals from said comparator circuit, wherein said control signal activates said coolant pump when said cooling system controller receives said second signal, and wherein said control signal deactivates said coolant pump when said cooling system controller receives said first signal, and wherein said control signal output by said cooling system controller activates said refrigeration system when said cooling system controller receives said second signal from said comparator circuit.

2. The thermal management system of claim 1, said cooling system further comprising a radiator coupled to said coolant loop, wherein said coolant passes through said radiator as said coolant is pumped through said coolant loop with said coolant pump.

3. The thermal management system of claim 1, wherein said preset temperature is comprised of a range of temperatures, wherein said comparator circuit outputs a third signal when said ESS temperature is within said range of temperatures, wherein said control signal output by said cooling system controller activates said coolant pump when said cooling system controller receives said third signal.

4. The thermal management system of claim 1, cooling system further comprising a blower fan for directing air through said radiator, wherein said control signal output by said cooling system controller activates said blower fan when said cooling system controller receives said second signal from said comparator circuit.

5. The thermal management system of claim 1, further comprising a state of charge (SOC) sensor coupled to said ESS and to said temperature control system, said SOC sensor monitoring a current SOC of said ESS, wherein said cooling system controller is configured to output a deactivation signal to said cooling system when said current SOC is less than a preset target SOC.

6. A thermal management system for an electric vehicle, comprising:
    an electrical energy storage system (ESS) coupled to an electric vehicle powertrain, said electrical ESS supplying power to an electric motor of said electric vehicle powertrain;
    a cooling system comprised of a coolant within a coolant loop, said coolant loop in thermal communication with said ESS, said coolant system further comprised of a coolant pump for pumping said coolant through said coolant loop, said cooling system further comprising:
        a radiator coupled to said coolant loop, wherein said coolant passes through said radiator as said coolant is pumped through said coolant loop with said coolant pump;
        a blower fan for directing air through said radiator;
    a temperature control system coupled to said cooling system, wherein said cooling system is under the control of said temperature control system, wherein said temperature control system further comprises:
        a vehicle condition monitor, wherein said vehicle condition monitor outputs a first condition signal when said electric vehicle is on and outputs a second condition signal when said electric vehicle is off;

a charging system monitor, wherein said charging system monitor outputs a first status signal when said electric vehicle is coupled to a battery charging system and outputs a second status signal when said electric vehicle is not coupled to a battery charging system;

at least one temperature sensor in thermal communication with said ESS, said at least one temperature sensor monitoring an ESS temperature;

a comparator circuit for comparing said ESS temperature with a preset temperature, wherein said comparator circuit outputs a first signal when said ESS temperature is less than said preset temperature and outputs a second signal when said ESS temperature is greater than said preset temperature;

a cooling system controller coupled to said cooling system, said cooling system controller configured to output a control signal to said cooling system when said vehicle condition monitor outputs said second condition signal and said charging system monitor outputs said second status signal, said cooling system controller further configured to receive said first and second signals from said comparator circuit, wherein said control signal activates said coolant pump when said cooling system controller receives said second signal, and wherein said control signal deactivates said coolant pump when said cooling system controller receives said first signal;

wherein said control signal output by said cooling system controller activates said blower fan when said cooling system controller receives said second signal from said comparator circuit; and wherein said preset temperature is comprised of a range of temperatures, wherein said comparator circuit outputs a third signal when said ESS temperature is within said range of temperatures, wherein said control signal output by said cooling system controller activates said coolant pump when said cooling system controller receives said third signal.

7. The thermal management system of claim 6, further comprising a state of charge (SOC) sensor coupled to said ESS and to said temperature control system, said SOC sensor monitoring a current SOC of said ESS, wherein said cooling system controller is configured to output a deactivation signal to said cooling system when said current SOC is less than a preset target SOC.

8. A thermal management system for an electric vehicle comprising:

an electrical energy storage system (ESS) coupled to an electric vehicle powertrain, said electrical ESS supplying power to an electric motor of said electric vehicle powertrain;

a cooling system comprised of a coolant within a coolant loop, said coolant loop in thermal communication with said ESS, said coolant system further comprised of a coolant pump for pumping said coolant through said coolant loop, said coolant system further comprised of a radiator coupled to said coolant loop, wherein said coolant passes through said radiator as said coolant is pumped through said coolant loop with said coolant pump;

a refrigeration system independent of said cooling system, said refrigeration system comprised of a compressor and a condenser;

a heat exchanger in thermal communication with said refrigeration system and in thermal communication with said cooling system via said coolant loop;

a cooling system controller coupled to said cooling system and to said refrigeration system, said cooling system controller activated when said electric vehicle is turned off, said cooling system controller configured to output a cooling system deactivation signal to said cooling system and a refrigeration system deactivation signal to said refrigeration system in response to receiving a first command signal, said cooling system controller configured to output a cooling system activation signal to said cooling system and said refrigeration system deactivation signal to said refrigeration system in response to receiving a second command signal, and said cooling system controller configured to output said cooling system activation signal to said cooling system and a refrigeration system activation signal to said refrigeration system in response to receiving a third command signal;

a state of charge (SOC) sensor coupled to said ESS and monitoring a current SOC of said ESS, wherein said SOC sensor transmits a first command signal to said cooling system controller when said current SOC is less than a preset target SOC;

at least one temperature sensor in thermal communication with said ESS, said at least one temperature sensor monitoring a current ESS temperature; and a comparator circuit for comparing said current ESS temperature with a preset temperature range, wherein said comparator circuit outputs said first command signal to said cooling system controller when said current ESS temperature is lower than said preset temperature range, wherein said comparator circuit outputs said second command signal to said cooling system controller when said current ESS temperature is within said preset temperature range, and wherein said comparator circuit outputs said third command signal to said cooling system controller when said current ESS temperature is greater than said preset temperature range.

* * * * *